Feb. 14, 1967 D. W. NORWOOD 3,304,435
PHOTOMETRIC DEVICE HAVING GREATER RESPONSE TO A PREFERENTIAL
CENTRAL PORTION OF A SCENE
Filed July 18, 1963
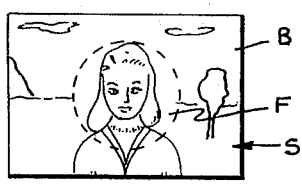
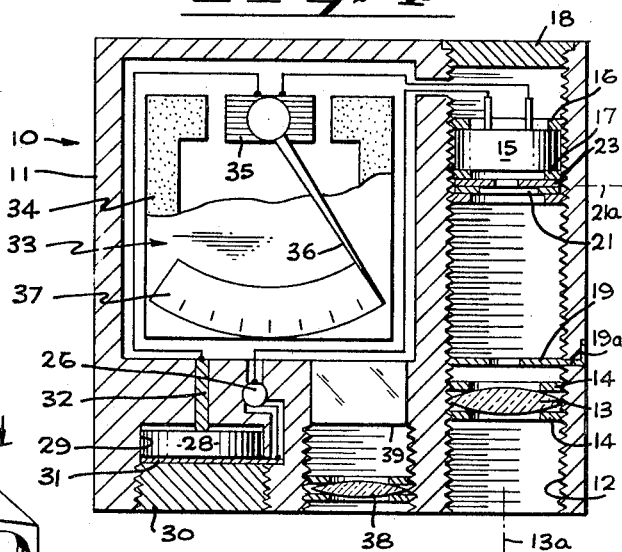
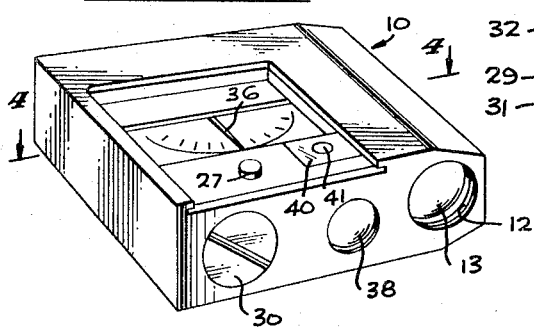
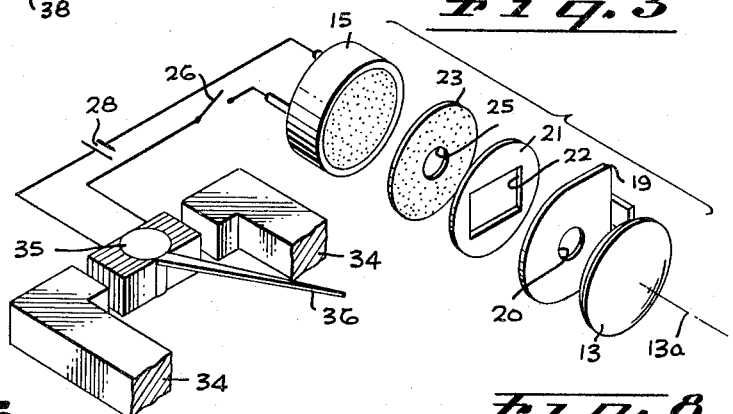
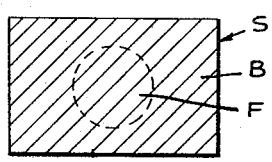
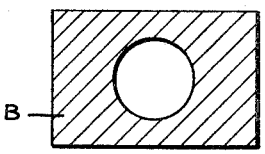
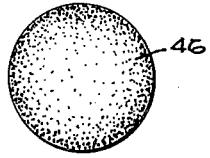
DONALD W. NORWOOD
INVENTOR.

United States Patent Office 3,304,435
Patented Feb. 14, 1967

3,304,435
PHOTOMETRIC DEVICE HAVING GREATER RESPONSE TO A PREFERENTIAL CENTRAL PORTION OF A SCENE
Donald W. Norwood, 1470 San Pasqual St., Pasadena, Calif. 91106
Filed July 18, 1963, Ser. No. 295,963
10 Claims. (Cl. 250—237)

This invention relates to unique photometric devices for simultaneously evaluating two light fields of different size, one of which is centrally located within the other field. The device is particularly useful in photographic practice, for incorporation into an instrument which will serve to simultaneously evaluate the significant fields of brightness in a photographic scene, and produce a composite indication of the different fields, or directly actuate the exposure controls of a camera in accordance with variations in the brightness of the fields.

I have observed that the usual practice of photographers, when composing a photographic scene, is to so aim the camera that the center of interest is located at, or near to, the center of the camera frame. This is a very natural procedure because it follows the practice of the human eye when observing a scene. When observing a scene the eyeball is usually so turned that the image of the center of interest in the scene falls upon the fovea portion of the retina. The fovea area is relatively small and is located close to the center of the retina. The fovea is responsive to the image of the center of interest with a high degree of visual acuity. The retina which surrounds the fovea is responsive to the rest of the scene with a lower degree of visual acuity.

Here we have two points of unusual significance. One is that the eye so operates as to locate the center of interest in a scene at the approximate center of the visual field. The other point is that since the fovea has higher visual acuity than the rest of the retina the adaption of the eye to light intensity is based to a large extent on the brightness of the center of interest and to a secondary extent on the brightness of the remainder of the scene.

I have designed a reflected light exposure meter which separately recognizes the average brightness of the center of interest, or preferential central portion of a scene, and the average brightness of the remainder, or background of the scene. The actions are simultaneous and automatic, and the end result is an intermediate value between the value of the average brightness of the preferential central usually smaller portion of the scene and the value of the average brightness of the usually larger background portion of the scene. This produces exposure results which are quite superior.

Such results are quite different from those produced by the typical reflected light meter which views the scene and adjacent surrounding area as a whole. The average brightness of the center of interest in the scene, in that case, has small influence on the response of the meter because of the usual relatively small area of the center of interest.

The results are also quite different from, and superior to the results produced by those reflected light meters which are designed to measure *only* the light from the preferential central portion of a scene, because those meters fail to take into account an appropriate influence from the brightness of the scene background.

In my copending application for Letters Patent, Serial Number 29,341, filed May 16, 1960, entitled, "Light Responsive Unit Having Two Acceptance Angles," and since matured into U.S. Patent Number 3,121,170, issued on February 11, 1964, I disclosed a photometric device designed to respond partially to the average brightness across an entire scene to be photographed, and partially to the average brightness within a usually central preferential portion of the scene. In that arrangement, two photoelectric cells are employed, for responding to the light within these two fields respectievly, and actuating a common meter indicator or iris mechanism, in a manner integrating the two responses in a properly weighted manner so that the preferential central area of the scene is given more weight in determining the ultimate indication or camera setting than would be the case if only a single conventional cell were employed for response to the entire scene uniformly. It has been found that highly improved photographic results are attained in this manner, particularly where unusually light or dark backgrounds would otherwise result in a photograph of unpleasing overall appearance.

A major object of the present invention is to provide an improved photometric device which is capable of attaining the above discussed composite two field type of response, but can do so with a much simpler and less expensive structural arrangement than the two cell apparatus of my above identified application. More particularly, the present invention renders possible the two field weighted response in apparatus which may include only a single photoelectric cell and a single lens structure or other image forming means, rather than two cells and two separate lenses.

Structurally, a device embodying the invention includes, in combination with the single image forming means, a light responsive assembly which is specially designed to provide for differential response to light from different portions of the scene, with greater response to each lumen in the preferential central usually smaller portion of the scene than to each lumen in the usually larger remainder of the scene. Further, the light responsive assembly produces this differential response to different portions of the same image formed by the mentioned image forming means. In one form of the invention, the differential response is attained by the use of special light filter means in conjunction with a single photoelectric cell, acting to reduce the brightness of the image on the cell except at the location of the preferential central portion of that image, so that increased weight is given to the light of that central area in the ultimate indicating or iris actuating effect. In another form of the invention, the photoelectric cell is itself designed to be of non-uniform sensitivity, having an increased sensitivity central portion and a surrounding area of lesser sensitivity.

The above and other features and objects of the invention will be better understood from the following detailed description of the typical embodiments illustrated in the accompanying drawing in which:

FIG. 1 is a diagramamtic representation of a scene which is to be photographed;

FIG. 2 is a perspective view of a light meter constructed in accordance with the invention;

FIG. 3 is a fragmentary exploded perspective of some of the interior parts of the meter;

FIG. 4 is a horizontal section through the FIG. 2 meter, taken on line 4—4 of FIG. 2;

FIG. 5 illustrates diagrammatically a specially constructed photoelectric cell to be used in a variational form of the meter;

FIGS. 6, 7 and 8 are graphical representations of the theory of operation of the invention; and FIG. 9 illustrates another form of the invention.

With reference first to FIG. 1, the typical scene there shown, which is to be recorded on film in a camera, may be considered as consisting of the following significant fields of brightness:

(1) The entire scene area, designated by the letter S, (2) The central or preferential area F (inside the broken line circle), and (3) The background area B, including all parts of the scene which are outside of area F.

The preferential central area F is arbitrarily assumed to be circular in form, smaller in size than the entire scene S, and located near its center. Area F usually includes particularly important parts of the scene, such as a subject in the foreground.

The devices of the present invention are so constructed as to provide a greater response to light received from the foreground area F than to light from the background area B, since the total amount of light received from area F is usually smaller than that from area B, and would not have an adequate effect on the ultimate indication or iris actuation if not given the advantage of a differential increased response. Preferably, the device is so constituted that the average brightness of the preferential scene area F has an influence at least as great as the influence of the average brightness of the entire background area B.

Referring now to FIGS. 2 through 4, the photographic light meter 10 there shown includes a housing 11 of opaque plastic or other material having an internally threaded passage 12 extending therethrough and containing a lens 13 secured by externally threaded rings 14. Spaced rearwardly of lens 13, within passage or channel 12, is a conventional photoelectric cell 15, held in place along with certain other parts to be described at a later point by two externally threaded rings 16 screwed into passage 12. The passage is open at its forward end to allow unimpeded access of significant light to the lens; and is closed at its opposite end by an opaque threaded plug 18. The lens serves to form and project inwardly an image of any photographic scene toward which the instrument is aimed, with the lens and cell both being disposed transversely of a main axis 13a of the light receiving system.

Closely adjacent to the back of the lens, there is provided within passage 12 an opaque typically metal plate 19 disposed transversely of axis 13a and having a central desirably circular aperture 20 for passing a limited controlled amount of light from the lens to cell 15. Plate 19 is receivable within a transverse slot 19a formed in the housing, and is slidably removable from that slot to allow replacement of other similar plates having apertures of different sizes and therefore different light passing capacities, to thereby adjust the sensitivity of the instrument for different combinations of film sensitivity and shutter time which are to be used in the camera for which meter 10 is taking a light reading.

Spaced rearwardly of plate 19, and near but in front of cell 15, passage 12 contains a thin opaque masking disc 21, having a rectangular light passing aperture 22 of a size and shape to provide an appropriate boundary for the image of the photographic scene S. Adjacent to and behind disc 21, there is provided within passage 12 another disc 23 taking the form of a neutral density light filter or screen, which may in the preferred form of the invention have a transmission factor of 0.125. Discs 21 and 23 are disposed transversely of axis 13a, and are retained between threaded rings 16, along with photoelectric cell 15 and a spacer 17.

Filter 23 contains a central aperture 25, preferably circular in form and smaller than rectangular aperture 22 of masking plate 21, and defining the central preferential portion of the image. In the preferred form of the invention, aperture 25 may have an area of approximately ⅛ the size of aperture 22.

Elements 21 and 23 are located at essentially the focal plane 21a of lens 13, that is, the plane within which the image of scene S is formed by lens 13 (for subjects spaced a medium or average distance from the meter).

The electrical circuit of the meter includes, in series with photocell 15, an "ON-OFF" switch 26 having an actuating push button 27, a battery 28 (typically 1.35 volt), and an electrically actuated indicator 33. The battery may be retained within a cavity 29 in the housing by means of a screw plug 30 which is removable for replacement of the battery, with suitable electrodes or contacts 31 and 32 being contained within the housing for electrical engagement by the battery. In the figures, it is assumed that cell 15 is photoresistive, of the cadmium sulphide type, to vary the actuation of indicator unit 33 in proportion to the illumination of the cell. However, it is to be understood that a photovoltaic cell, or other type of photoelectric cell may be utilized in the system if desired, with elimination of battery 28 where the cell itself acts to produce rather than merely regulate current.

Indicator unit 33 may be a moving coil instrument of the D'Arsonval type, having a permanent magnet 34, a moving coil 35, a pointer 36 carried and actuated by coil 35, and a stationary scale 37 along which the pointer is movable.

As will be apparent, when push button 27 is operated to close switch 26, current supplied by battery 28 flows through the series circuit, with the amount of current being controlled chiefly by the resistance established by photoresistive cell 15. The amount of current therefore determines the extent of angular displacement of coil 35 and its pointer 36. The constants in the circuit may be so selected that the resistance of photoelectric cell 15 will be indicated by the angular displacement of pointer 36, and since the resistance of the cell is a function of the effective light falling thereon, the angular displacement of the pointer will be an indication of the illumination of the photoelectric cell.

The meter may have a conventional viewfinder, including a lens 38 whose axis is offset laterally from and parallel to main axis 13a. The light passing through lens 38 may be reflected upwardly by a mirror 39 disposed at a 45 degree angle to the axis of lens 38, to produce an image focused on a translucent viewing screen 40 (FIG. 2). Screen 40 defines the rectangular boundary of the photographic scene S, as it appears in the viewfinder, and has a circle 41 inscribed on the screen to define the boundary of the central preferential area F of the photographic scene.

In using the device of FIGS. 2 through 4, an operator holds the meter in his hand and directs lens 13 toward the scene to be photographed. Scene S is then visible through the viewfinder, as in FIG. 1, and the main person or object to be photographed is contained within the circle 41 defining the preferential scene area F of FIG. 1. As illustrated, this preferential subject will in many instances be the face of a person being photographed.

With the meter held in this position, the operator presses button 27, to obtain a reading from pointer 36 indicating a proper setting for the camera. This reading automatically provides consideration of the average brightnesses of the two significant light fields F and B. The theoretical discussion below brings out in greater detail the manner in which the brightnesses of the two areas are determined and are integrated in the composite single actuation of pointer 36.

For the purpose of this discussion let us consider a test scene S, shown in FIG. 6. This scene differs from the typical scene of FIG. 1, in that it has uniform brightness across the entire area, as where the scene consists of a gray test card, uniformly illuminated. The dotted line thereon serves to show the boundary between the preferential central portion F, and the remainder B, of the scene. FIG. 7 shows the preferential portion F, as a separate entity. FIG. 8 shows the remainder of the scene B, as a separate entity.

The invention hereinbefore described provides means for forming, and projecting inwardly, images of areas F and B; which image areas are designated respectively $F_1$ and $B_1$. The number of lumens in each image area at the focal plane, and before passing through the filter, will be proportional to the number of lumens radiated by each area of the scene, respectively. The lumens in these various image areas will, after passing through the filter, impinge on the photocell and thereby cause a response in the electrical circuit. The invention also provides means for causing a differential response, in the electrical circuit, to the lumens in image area $F_1$ and the lumens in image area $B_1$.

The differential response provides that the influence of each lumen in $F_1$ will be greater than the influence of each lumen in $B_1$. Various desirable end results can be achieved by means of selection of a suitable differential response ratio in relation to the relative sizes of the above-described image areas.

For example, in this special case of the uniform brightness subject, the influence of the total number of lumens in $F_1$ can be made equal to the influence of the total number of lumens in $B_1$. See FIGS. 7 and 8, for illustrations of the scene areas under comparison.

Due to the uniform scene brightness assumption, the total number of lumens in each image area will be proportional to the size of each image area. If the influence of each image area were unmodified, the circuit response to each image area would be proportional to the relative size of each image area. To provide equal circuit reponse to each of image areas $F_1$ and $B_1$, it is necessary to provide less circuit response to each lumen in image area $B_1$ than to each lumen in image area $F_1$. The ratio of circuit response to each lumen in image area $B_1$ relative to the circuit response to each lumen in image area $F_1$ is caused by the invention to be inversely proportional to the relative sizes of image areas $B_1$ and $F_1$.

This can be expressed as follows.
Let:
$R_F$=circuit response to each lumen in $F_1$
$R_B$=circuit response to each lumen in $B_1$
Then:

$$R_F : R_B = B_1 \text{ size} : F_1 \text{ size}$$

If the relative response value of $R_F$ is set at unity, 1,
Then, $$R_B = \frac{F_1 \text{ area}}{B_1 \text{ area}}$$

which is the necessary decreased response factor to each lumen in $B_1$.

This formula is a preferred one for many situations in which an instrument embodying the invention is to be used. In a particular device which at present is considered, for many uses, an excellent embodiment of the invention, the relative size of $F_1$ is given as 1, and the relative size of $B_1$ as 8. By substitution in the above formula, $$R_B = \frac{1}{8} = 0.125$$

Therefore a filter with a transmission factor of 0.125 is selected for the preferred device.

In the case of a typical photographic scene, as distinguished from the uniform brightness test scene discussed above, the scene is usually not uniformly bright throughout. Consequently, the number of lumens in each of the image areas $F_1$ and $B_1$, respectively, is not proportional to the respective sizes of the image areas. However, the average influence of each of these image areas is so modified by the device that the electric circuit response to each correctly represents the average brightness of the corresponding area of the scene.

In a device embodying the invention, the photocell integrates the light energy received thereby to assume a resistance dependent upon the total illumination of the cell. The deflection of pointer 36 by the photoelectric cell indicates on scale 37 the composite reading desired, which in the above discussed preferred arrangement represents an intermediate value between the average brightnesses of the two light fields F and B. The scale can be directly calibrated in terms of camera lens aperture settings. Thus, a significant indication or exposure control adjustment is provided by the device.

While I have described a preferred arrangement in which the elements of the scene separator and modifier have aperture sizes and transmission values so selected that the smaller field F has a size ⅛ of the area of the larger field B, and the filter has a transmission factor of 0.125; and each light field has equal influence in the determination of the final result, it is possible to use somewhat different values for the relative sizes of the two light fields, by alteration of the size of aperture 25, in which case a compensating change in transmission value for the filter may be made according to the formula hereinbefore shown, in order to preserve the relative influence values of each light field. It is also possible to assign a different ratio to the relative values of influence of the two light fields, by independently altering the transmission factor of the filter. Such variations of the several factors involved all lie within the scope of the invention, which is not limited to the selected values described as typical for use in a preferred form of the invention.

The positioning of the image separating and modifying elements 21 and 23 at the focal plane of the optical system allow these parts to operate with great precision, due to the sharp definition of the different image areas at this plane. The transmitted image then preferably proceeds through a short but significant distance before impinging on the sensitive surface of the photoelectric cell, to enable the image areas, in accordance with the laws of optics, to become somewhat diffused before impinging on the cell, without of course changing the totals of light energy units which reach the cell. Such diffusion of the image areas is quite advantageous in that it tends to offset any small irregularities, from point to point, in the sensitivity of the cell surface. Other means of diffusion, such as a ground glass disc or its equivalent, could be used for this purpose if desired.

FIG. 5 illustrates a variational type of photoelectric cell 45 which may be substituted for cell 15 of FIGS. 2 through 4, with the sensitive surface of the photocell being positioned in the focal plane of lens 13, and with parts 21 and 23 being omitted from the device. Cell 45 is itself constructed to have a sensitive surface which is non-uniform with respect to its response to light energy. More specifically, cell 45 may have a central circular area 44 (corresponding to area F of FIG. 1), and having relatively great sensitivity to light falling thereon. About circular area 44, there is a rectangular area 43 of reduced sensitivity, say for example 0.125 the sensitivity, per unit area, of zone 44. The outer portion 42 of the cell may be completely insensitive to light.

Different sensitivity characteristics for different areas of the cell surface can be accomplished by means of applying the formulas shown in a technical paper entitled, "Sintered Cadmium Sulphide Photoconductive Cells," by C. P. Hadley and E. Fischer, from Proceedings of 1959 National Electronics Conference, Publication No. ST–1670, pp. 3, 4 and 5. These formulas can be applied, at the time of construction of the cell, with different controllable factors, such as electrode length, electrode gap width, thickness of cadmium sulphide layer, to different areas of the cell surface, to attain the result described above.

Each lumen falling on the central or preferential area 44 of the cell of FIG. 5 produces a greater deflection of the pointer than does each lumen falling on area 43, to attain the same overall result accomplished by the first form of the invention.

In the first form of the invention previously described, the boundaries of the preferential and remaining light field image areas are defined sharply by filter element 23. It is contemplated, however, that if desired these boundaries may be irregular, or diffusive, so that the boundaries of one image area gradually blend into the boundaries of the other image area. FIG. 9 illustrates a variational type of filter element 46, which may be substituted for filter 23 of FIGS. 2 through 4, to attain such gradual blending of the two image areas. The FIG. 9 filter is of a differential transmission type, having light transmission characteristics which are non-uniform across its surface, and which preferably decrease progressively from high transmission capacity at the center of the filter to a low transmission capacity at the edge of the filter. As will be apparent, in a device utilizing the filter of FIG. 9, the central area is treated preferentially, so that each lumen impinging upon the central or preferential portion of the filter will produce a greater ultimate response than will each lumen falling on a portion of the filter nearer to its periphery. A similar progressive or taper response characteristic can be given to the device by utilizing a photoelectric cell having a progressive or tapering response characteristic changing gradually from high response near the center to low response near its periphery, with the filter in this case desirably being eliminated.

Another way of attaining a gradual rather than sharply defined boundary between the preferential and remaining image areas is to merely locate the filter 23 of FIGS. 2 through 4 a substantial distance from the focal plane of lens 13. There appears no necessity to illustrate this form separately, inasmuch as FIGS. 2 through 4 can be considered as showing this variational arrangement, if it is assumed that the focal plane of lens 13 is located midway between filter 23 and photoelectric cell 15, with elements 23 and 15 preferably being spaced axially apart farther than in FIG. 4 in order to assure substantial blurring of the image at both the filter location and the photoelectric cell location. In such an arrangement, the somewhat out of focus condition of the image as it passes through filter 23 results in a gradual or progressive change in response in the boundary area between the preferential and remaining portions of the image.

The various forms of the invention have been described and illustrated as applied to a photographic light meter. It is to be understood, however, that the photometric unit of the invention may also be utilized for direct operation of a camera lens aperture control, in an automatic type camera, in which case moving coil 35 may be directly mechanically connected to a camera iris or the like for operation thereof.

What is claimed as new is:

1. A photometric device comprising a single means for forming a single image of a scene, a single means responsive to the light of said image and operable to vary an electrical signal in accordance with the brightness thereof, said light responsive means including means for introducing a difference in response between different portions of said image so that each lumen coming from a preferential central portion of the scene and forming a corresponding preferential central portion of said image will cause a greater electrical output signal than each lumen coming from the remaining portion of the scene and being part of a remaining portion of said same image produced by said same image forming means, and an electrically actuated unit operable by said light responsive means in response to light in each of said portions of said image and to a greater extent by each lumen from said preferential central portion of the scene than by each lumen from said remaining portion thereof.

2. A photometric device comprising a single lens structure for forming a single image of a scene, a single means responsive to the light of said image and operable to vary an electrical signal in accordance with the brightness thereof, said light responsive means including means for introducing a difference in response between different portions of said image so that each lumen coming from a preferential central portion of the scene and forming a corresponding preferential central portion of said image will cause a greater electrical output signal than each lumen coming from the remaining portion of the scene and being in a remaining portion of said same image produced by said same lens structure, and an electrically actuated unit operable by said light responsive means in response to light in each of said portions of said image and to a greater extent by each lumen from said preferential central portion of the scene than by each lumen from said remaining portion thereof.

3. A photometric device as recited in claim 2, including a rectangular mask for defining the periphery of said image and disposed about the outer portion of the filter means.

4. A photometric device comprising a single means for forming a single image of a scene, a single means responsive to the light of said image and operable to vary an electrical signal in accordance with the brightness thereof, said light responsive means including means for introducing a difference in response between different portions of said image so that each lumen coming from a preferential central portion of the scene and forming a corresponding preferential central portion of said image will cause a greater electrical output signal than each lumen coming from the remaining portion of the scene and being in a remaining portion of said image produced by said same image forming means, said light responsive means including a photoelectric cell onto which the light of said image is directed and filter means serving as said means for introducing a difference in response and constructed to reduce the brightness of said remaining portion of the image relative to said primary portion, and an electrically actuated unit operable by said light responsive means in response to light in each of said portions of said image and to a greater extent by each lumen from said preferential central portion of the scene than by each lumen from said remaining portion thereof.

5. A photometric device comprising a single means for forming a single image of a scene, a single means responsive to the light of said image and operable to vary an electrical signal in accordance with the brightness thereof, said light responsive means including means for introducing a difference in response between different portions of said image so that each lumen coming from a preferential central portion of the scene and forming a portion of the said preferential central portion of said image will cause a greater electrical output signal than each lumen coming from the remaining portion of the scene and being in a remaining portion of said same image produced by said same image forming means, said light responsive means including a photoelectric cell onto which the light of said image is directed and constructed to be more sensitive to light at said preferential central portion of the image than at said remaining portion thereof so that the cell itself serves as said means for introducing a difference in response, and an electrically actuated unit operable by said light responsive means in response to light in each of said portions of said image and to a greater extent by each lumen from said preferential central portion of the scene than by each lumen from said remaining portion thereof.

6. A photometric device comprising a single lens structure for forming a single image of a scene, a single means responsive to the light of said image and operable to vary an electrical signal in accordance with the brightness thereof, said light responsive means including means for introducing a difference in response between different portions of said image so that each lumen coming from a preferential central portion of the scene and forming a corresponding preferential central portion of said image will cause a greater electrical output signal than each lumen coming from the remaining portion of the scene and being in a remaining portion of said same image produced by said same lens structure, said light responsive means including a photoelectric cell onto which the light of said image is directed and filter means serving as said means for introducing a difference in response and constructed to reduce the brightness of said remaining portion of the image relative to said preferential central portion, and an electrically actuated unit operable by said light responsive means in response to light in each of said portions of said image and to a greater extent by each lumen from said preferential central portion of the scene than by each lumen from said remaining portion thereof, said filter means being located at the focal plane of said image produced by said lens structure, and said photoelectric cell being located slightly beyond said filter means in the direction of light travel.

7. A photometric device comprising a single means for forming a single image of a scene, a single means responsive to the light of said image and operable to vary an electrical signal in accordance with the brightness thereof, said light responsive means including differential filter means for introducing a difference in response between different portions of said image so that each lumen coming from a preferential central smaller portion of the scene and forming a corresponding preferential central smaller portion of said image will cause a greater electrical output signal than each lumen coming from the remaining larger portion of the scene and being part of a remaining larger portion of said same image produced by said same image forming means, and an electrically actuated unit operable by said light responsive means in response to light in each of said portions of said image and to a greater extent by each lumen from said preferential central smaller portion of the scene than by each lumen from said remaining larger portion thereof, said difference in response being of such value that the average brightness of the preferential central smaller portion of the image will have at least as much influence in determining the magnitude of the electrical output signal as will the average brightness of the remaining larger portion of the image.

8. A photometric device comprising a single means for forming a single image of a scene, a single means responsive to the light of said image and operable to vary an electrical signal in accordance with the brightness thereof, said light responsive means including a photoelectric cell having a differential response to different portions of said image so that each lumen coming from a preferential central smaller portion of the scene and forming a corresponding preferential central smaller portion of said image will cause a greater electrical output signal than each lumen coming from the remaining larger portion of the scene and being part of a remaining larger portion of said same image produced by said same image forming means, and an electrically actuated unit operable by said light responsive means in response to light in each of said portions of said image and to a greater extent by each lumen from said preferential central smaller portion of the scene than by each lumen from said remaining larger portion thereof, said difference in response being of such value that the average brightness of the preferential central smaller portion of the image will have at least as much influence in determining the magnitude of the electrical output signal as will the average brightness of the remaining larger portion of the image.

9. A photometric device comprising a single means for forming a single image of a scene, a single means responsive to the light of said image and operable to vary an electrical signal in accordance with the brightness thereof, said light responsive means including differential filter means for introducing a difference in response between different portions of said image so that each lumen coming from a preferential central smaller portion of the scene and forming a corresponding preferential central smaller portion of said image will cause a greater electrical output signal than each lumen coming from the remaining larger portion of the scene and being part of a remaining larger portion of said same image produced by said same image forming means, and an electrically actuated unit operable by said light responsive means in response to light in each of said portions of said image and to a greater extent by each lumen from said preferential central smaller portion of the scene than by each lumen from said remaining larger portion thereof, so that said electrically actuated unit will indicate an intermediate value between the average brightness of the preferential central smaller portion of the scene and the average brightness of the remaining larger portion of the scene.

10. A photometric device comprising a single means for forming a single image of a scene, a single means responsive to the light of said image and operable to vary an electrical signal in accordance with the brightness thereof, said light responsive means including a photoelectric cell having a differential response to portions of said image so that each lumen coming from a preferential central smaller portion of the scene and forming a corresponding preferential central smaller portion of said image will cause a greater electrical output signal than each lumen coming from the remaining larger portion of the scene and being part of a remaining larger portion of said same image produced by said same image forming means, and an electrically actuated unit operable by said light responsive means in response to light in each of said portions of said image and to a greater extent by each lumen from said preferential central smaller portion of the scene than by each lumen from said remaining or intermediate portion thereof, so that said electrically actuated unit will indicate an intermediate value between the average brightness of the preferential central smaller portion of the scene and the average brightness of the remaining larger portion of the scene.

References Cited by the Examiner

UNITED STATES PATENTS

| | | | |
|---|---|---|---|
| 2,091,762 | 8/1937 | Kuppenbender | 95—10 |
| 2,554,225 | 5/1951 | Taylor | 88—23 |
| 2,926,562 | 3/1960 | Bretthauer et al. | 250—237 X |
| 3,105,428 | 10/1963 | La Rue | 95—10 |
| 3,121,170 | 2/1964 | Norwood | 250—229 |
| 3,134,021 | 5/1964 | Ploke | 250—237 X |
| 3,177,762 | 4/1965 | Ito | 88—23 |
| 3,193,687 | 7/1965 | Hatcher | 250—237 X |
| 3,208,078 | 9/1965 | Koeber | 95—10 |

FOREIGN PATENTS 472,147    9/1937    Great Britain.

RALPH G. NILSON, *Primary Examiner.*

M. A. LEAVITT, *Assistant Examiner.*